United States Patent
Janmey (10) Patent No.: US 6,828,061 B2
(45) Date of Patent: Dec. 7, 2004

(54) ELECTROCHEMICAL CELL WITH REINFORCED SEPARATOR

(75) Inventor: Robert M. Janmey, North Ridgeville, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 525 days.

(21) Appl. No.: 10/002,577

(22) Filed: Oct. 26, 2001

(65) Prior Publication Data

US 2003/0082443 A1 May 1, 2003

(51) Int. Cl.$^7$ ................................................ H01M 2/18
(52) U.S. Cl. ...................... 429/133; 429/129; 429/131; 429/163; 429/164; 429/165; 429/169; 429/175; 429/186; 29/623.1; 29/623.2; 29/623.4; 29/623.5
(58) Field of Search ................................ 429/129, 131, 429/133, 163, 164, 165, 169, 175, 186; 29/623.1, 623.2, 623.4, 623.5

(56) References Cited

U.S. PATENT DOCUMENTS

| | | | |
|---|---|---|---|
| 3,056,849 A | 10/1962 | Warren et al. ................ | 136/83 |
| 3,318,737 A | 5/1967 | Watanabe et al. ............ | 136/133 |
| 3,748,181 A | 7/1973 | Alberto ....................... | 136/107 |
| 3,859,141 A | 1/1975 | Strauss et al. ............... | 136/175 |
| 4,074,023 A | 2/1978 | Urry ........................... | 429/56 |
| 4,076,907 A | 2/1978 | Oswald et al. ............... | 429/133 |
| 5,075,958 A | 12/1991 | Kelemen et al. .............. | 29/730 |
| 6,087,041 A | 7/2000 | Tucholski et al. | |
| 6,319,629 B1 | 11/2001 | de M. Ferreira | |
| 6,670,073 B2 * | 12/2003 | Tucholski et al. .......... | 429/163 |

FOREIGN PATENT DOCUMENTS

| | | |
|---|---|---|
| EP | 0 747 985 A1 | 12/1996 |
| GB | 1 511 305 | 5/1978 |
| JP | SHO 58 1983-172872 | 10/1983 |
| JP | 61-39452 | 2/1986 |
| JP | 1-311559 | 12/1989 |
| JP | HEI 7 1995-134977 | 5/1995 |
| JP | P2000-11986 A | 1/2000 |

* cited by examiner

Primary Examiner—Bruce F. Bell
(74) Attorney, Agent, or Firm—Stewart A. Fraser (57) ABSTRACT

An electrochemical cell with a separator having a reinforced edge that provides structural rigidity to the separator after it has been contacted by the cell's electrolyte. The reinforced edge extends beyond the interface between the cell's electrodes and serves to contain fragmented pieces from one of the cell's electrodes that may become dislodged when the cell is dropped.

45 Claims, 9 Drawing Sheets

ELECTROCHEMICAL CELL WITH REINFORCED SEPARATOR

BACKGROUND OF THE INVENTION

This invention generally relates to cylindrical batteries that utilize a tubularly shaped separator to contain and physically separate the battery's electrodes from one another. More particularly, this invention is concerned with a separator having a free standing portion that maintains its structural rigidity when wetted by the battery's electrolyte.

Cylindrically shaped batteries are suitable for use by consumers in a wide variety of devices such as flashlights, radios and cameras. Batteries used in these devices typically employ a cylindrical metal container to house two electrodes, a separator, a quantity of electrolyte and a closure assembly. Typical electrode materials include manganese dioxide as the cathode and zinc as the anode. The zinc is commonly employed in particulate form suspended in a gel. An aqueous solution of potassium hydroxide is a common electrolyte. A separator, conventionally formed from one or more strips of paper, is positioned between the electrodes. The electrolyte is readily absorbed by the separator and gelling medium.

One of the issues that battery manufacturers must address is the requirement that direct contact between the anode and cathode within the battery be prevented. If the anode and cathode are allowed to physically contact one another, a chemical reaction takes place and the useful electrochemical capacity of the battery is reduced. The function of the separator is to prevent direct contact between the anode and cathode while allowing for ionic conductivity therebetween.

Figure 1:
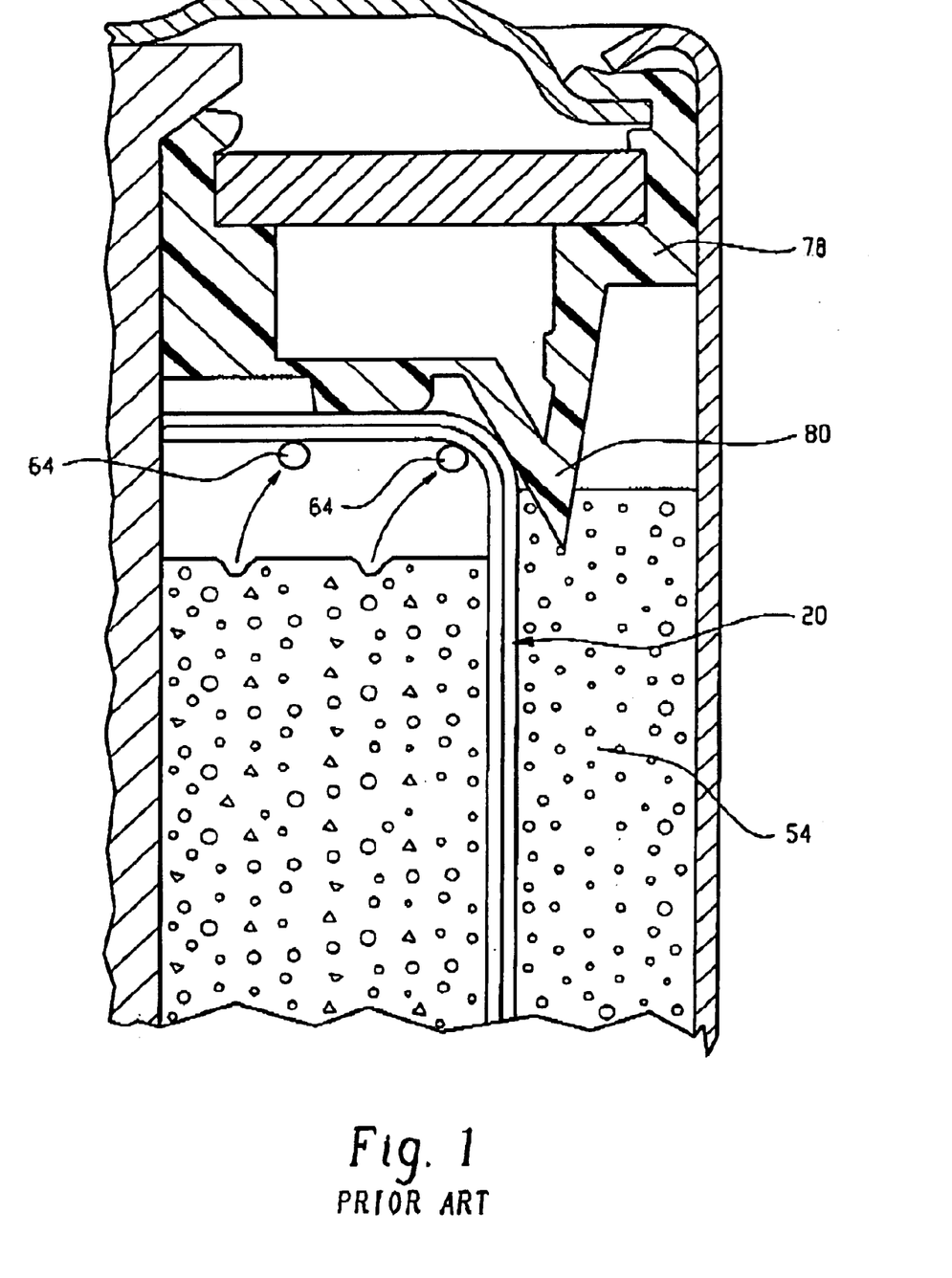
FIG. 1 is a partial cross-sectional view of a conventional electrochemical cell.
Figure 2:
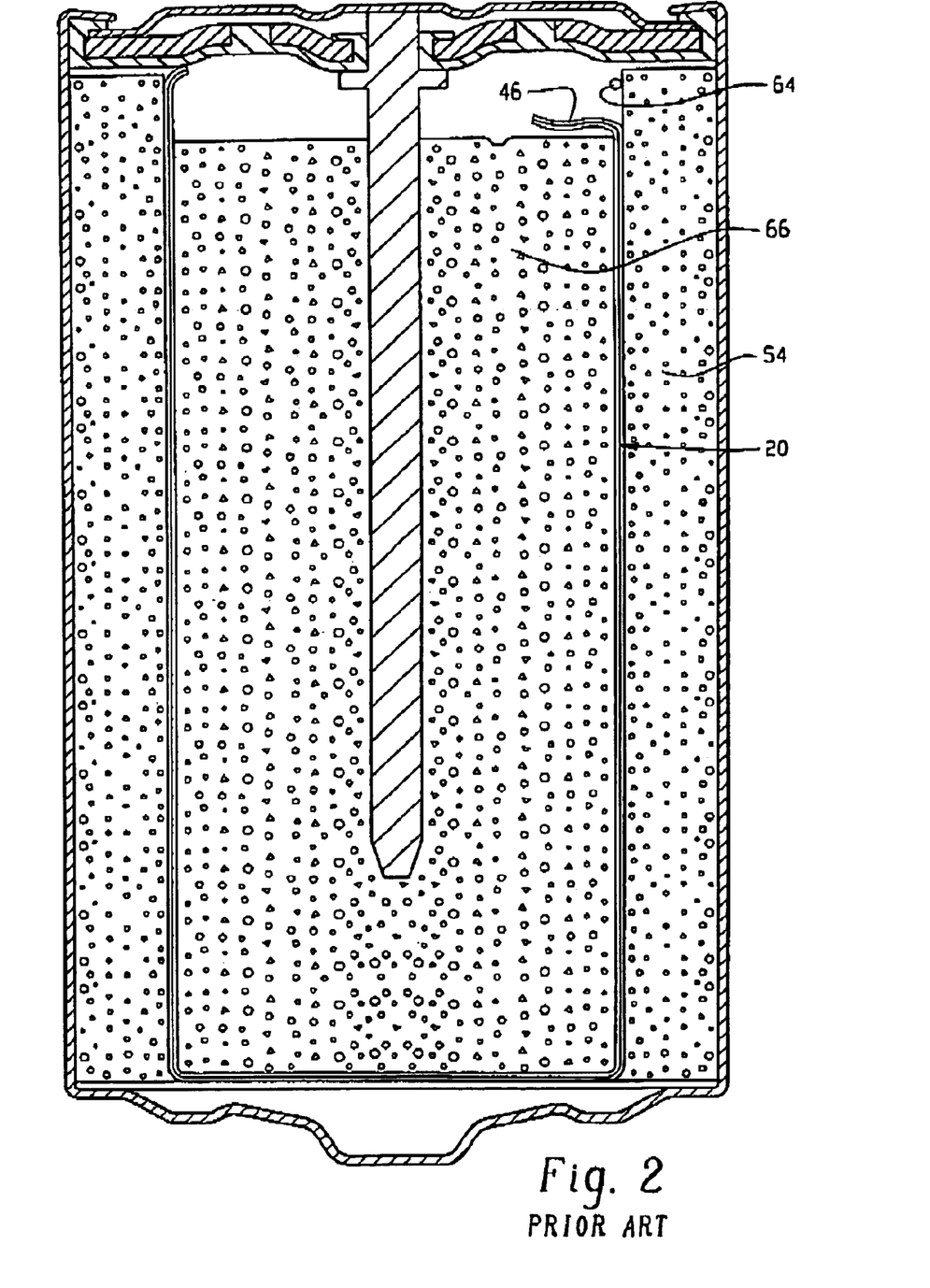
FIG. 2 is a cross-sectional view of a conventional electrochemical cell with a low profile seal assembly.

Small cylindrical batteries must be manufactured to withstand the physical rigors associated with the manufacturing and distribution processes as well as the handling of batteries by consumers. In particular, batteries must be able to withstand being accidentally dropped by consumers. In batteries with a semi-fluid electrode, such as the gelled anode used in many cylindrical alkaline batteries, the drop may cause a small portion of the anode to fragment and thereby break free from the rest of the anode. The fragmented anode must be prevented from coming into direct contact with the cathode. Similarly, if the cathode is hard and susceptible to fragmentation when the cell is dropped, small fragments of the cathode may become separated from the body of the cathode and need to be contained. As shown in FIG. 1, many conventional cell constructions have addressed this problem by using an elastomeric seal 78 that includes a V-shaped leg 80 that projects toward the interior of the cell and contacts the top of the coiled separator 20 thereby forming a barrier that prevents anode fragments 64 from contacting the cathode 54. However, the V-shaped projections on the conventional seal designs occupy a portion of the cell's internal volume which could be better used to hold an additional quantity of the cell's electrochemically active materials. Consequently, many cell designs have been proposed that utilize low volume seal designs which do not cooperate with the separator to form a barrier that isolates the anode from the cathode. Unfortunately, eliminating that portion of the seal that helps to contain the anode has led to an increased level of internal electrical shorting between the anode and cathode when cells are dropped by consumers. The internal shorting problem is due to the free standing portion of the separator, located above the anode/cathode interface, losing its stiffness when it absorbs some of the cell's electrolyte and then collapsing away from the low volume seal so that an unobstructed path is created between the anode and the cathode. As shown in FIG. 2, the collapsed portion 46 of the separator 20 has allowed a fragment 64 of anode 66 to contact cathode 54.

Therefore, there exists a need for a separator that will be structurally self supporting after absorbing the cell's electrolyte such that the separator can contain even small fragments of an electrode thereby preventing the formation of an internal electrical short circuit.

BRIEF SUMMARY OF THE INVENTION

The present invention provides an electrochemical cell with a separator having a free standing reinforced portion that is structurally self supporting even after absorbing some of the cell's electrolyte. The separator is reinforced by coating an edge of the separator so that the reinforced edge prevents fragmented pieces of one electrode from contacting the cell's opposing electrode. The coating material used to reinforce a portion of the separator occupies very little volume within the cell.

In one embodiment, the electrochemical cell of the present invention includes a container having an open end, a closed end and a sidewall. A first electrode is located within the container and defines a cavity having an interior surface. Electrolyte is located within the container and contacts the first electrode. A separator forms a lining on the interior surface of the cavity defined by the first electrode. The separator has a free standing reinforced edge that extends beyond the first electrode toward the open end of the container. The reinforced edge has a reinforcing material that provides structural support to the edge of the separator after the separator has absorbed a portion of the electrolyte. A second electrode is located within the separator cavity. The separator forms an interface between the first and second electrodes. A closure assembly is secured to the open end of the container.

The present invention also relates to a process for manufacturing a cell. The process includes the following steps. Providing a strip of separator material. Coating at least one edge of the separator with a reinforcing material. Coiling the coated separator strip to form a tube having a noncoated portion and a coated reinforced edge defining an opening at one end of the tube. Providing a container with an open end and including a first electrode defining a cavity therein. Inserting the coiled tube into the cavity defined by the first electrode so that the noncoated portion contacts the first electrode and a coated edge of the tube extends beyond the first electrode toward the open end of the container. Inserting a second electrode into the tube defined by the coiled separator. Closing the container by securing a closure assembly to the open end of the container.

The present invention also relates to another process for manufacturing a cell. This process includes the following steps. Providing a separator material. Coiling the separator to form a tube. Coating an edge of the tube with a reinforcing material. Providing a container having an open end, a closed end and a first electrode defining a cavity. Inserting the coiled coated separator tube into the cavity so that the open end of the tube is in close proximity to the open end of the container and the opposite end of the tube is in close proximity to the closed end of the container. Inserting a second electrode into the tube defined by the coiled separator. Closing the container by securing a closure assembly to the open end of the container.

The present invention relates to yet another process for manufacturing a cell. This process includes the following steps. Providing a container that has an open end, a closed end and a first electrode located within the container. The first electrode defines a cavity. Providing a first rectangularly shaped strip of separator that has two opposing edges coated with a reinforcing material. Inserting the coated strip of separator into the cavity defined by the first electrode so that uncoated portion of the separator lines the cavity and the coated edges extend beyond the first electrode toward the open end of the container. Inserting a second electrode into the separator lined cavity. Closing the container by securing a closure assembly to the open end of the container.

DETAILED DESCRIPTION OF THE INVENTION

Figure 8:
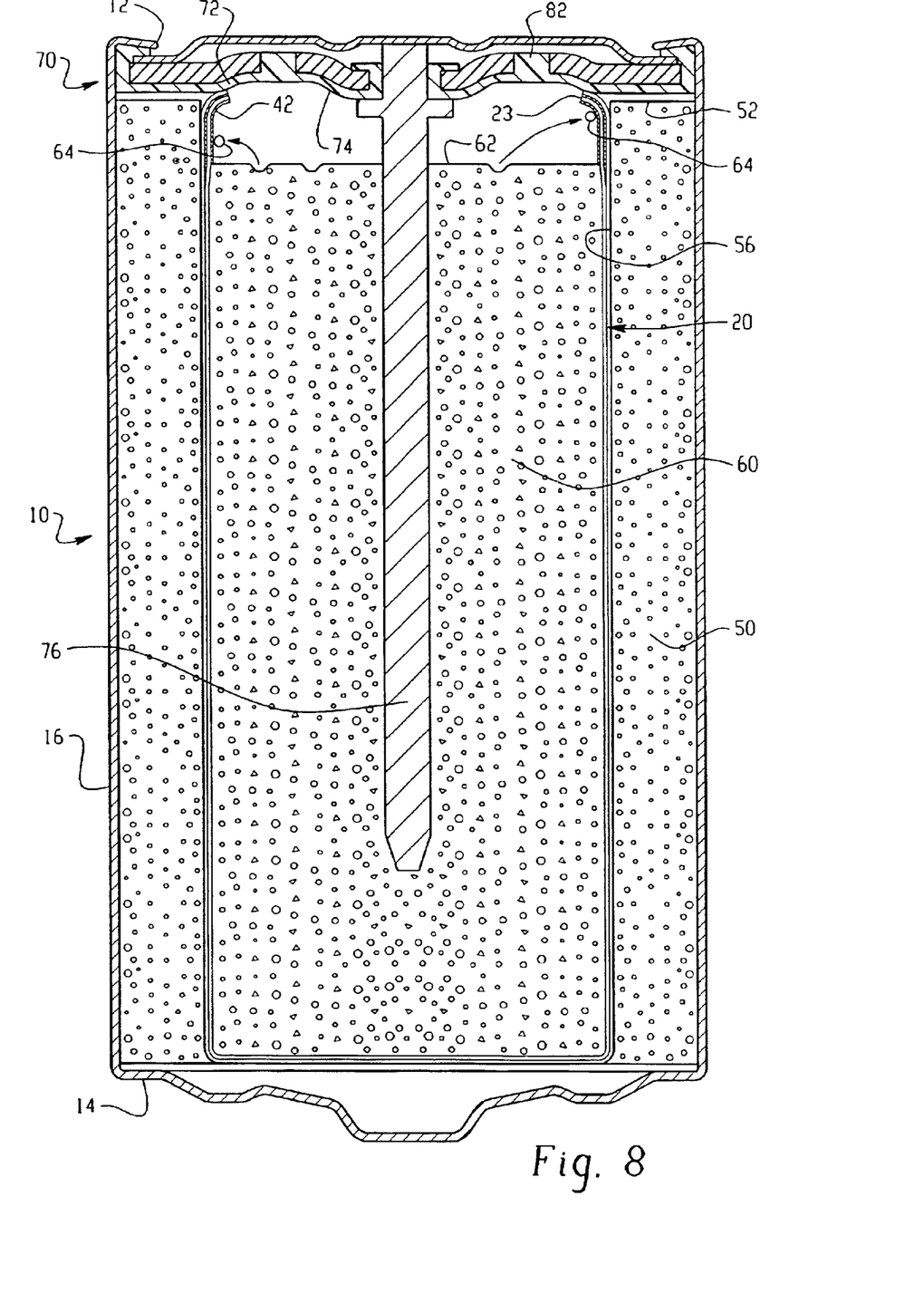
FIG. 8 is a cross-sectional view of a cell of this invention.

Referring now to the drawings and more particularly to FIG. 8, there is shown a cross-sectional view of an assembled electrochemical cell of this invention. Beginning with the exterior of the cell, the cell components are the container 10, first electrode 50 positioned adjacent the interior surface of container 10, separator 20 contacting the interior surface 56 of first electrode 50, second electrode 60 disposed within the cavity defined by separator 20 and closure assembly 70 secured to container 10. Container 10 has an open end 12, a closed end 14 and a sidewall 16 therebetween. The closed end 14, sidewall 16 and closure assembly 70 define a cavity in which the cell's electrodes are housed.

First electrode 50 is a mixture of manganese dioxide, graphite and an aqueous solution containing potassium hydroxide. The electrode is formed by disposing a quantity of the mixture into the open ended container and then using a ram to mold the mixture into a solid tubular shape that defines a cavity which is concentric with the sidewall of the container. First electrode 50 has a ledge 52 and an interior surface 56. Alternatively, the cathode may be formed by preforming a plurality of rings from the mixture comprising manganese dioxide and then inserting the rings into the container to form the tubularly shaped first electrode.

Second electrode 60 is a homogenous mixture of an aqueous alkaline electrolyte, zinc powder, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from B. F. Goodrich, Performance Materials Division, Cleveland, Ohio, USA. Carboxymethyylcellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. A suitable anode mixture contains 67 weight percent zinc powder, 0.50 weight percent gelling agent and 32.5 weight percent alkaline electrolyte having 40 weight percent potassium hydroxide. The quantity of zinc can range from 63 percent by weight to 70 percent by weight of the anode. Other components such as gassing inhibitors, organic or inorganic anticorrosive agents, binders or surfactants may be optionally added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like.

The second electrode may be manufactured by combining the ingredients described above into a ribbon blender or drum mixer and then working the mixture into a wet slurry. The slurry may also be described as a flowable paste or semifluid mixture. The slurry is susceptible to fragmentation when exposed to a physical shock such as vibration or dropping of the container that houses the slurry. In a battery, small droplets or fragments of the slurry may become separated from the bulk of the slurry thereby resulting in an electrical short within the cell if the droplets are not restrained from physically contacting the first electrode.

Electrolyte suitable for use in a cell of this invention is a thirty-seven percent by weight aqueous solution of potassium hydroxide. The electrolyte may be incorporated into the cell by disposing a quantity of the fluid electrolyte into the cavity defined by the first electrode. The electrolyte may also be introduced into the cell by allowing the gelling medium to absorb an aqueous solution of potassium hydroxide during the process used to manufacture the second electrode. The method used to incorporate electrolyte into the cell is not critical provided the electrolyte is in contact with the first electrode 50, second electrode 60 and separator 20.

Closure assembly 70 comprises closure member 72 and current collector 76. Closure member 72 is molded to contain a vent 82 that will allow the closure member 72 to rupture if the cell's internal pressure becomes excessive. The interior surface 74 of closure member 72 is designed to minimize the volume occupied by the closure member and thus does not employ protrusions that are designed to limit the movement of a fragmented electrode. Furthermore, separator 20 is not adhesively secured to closure member 72.

Closure member 72 may be made from Nylon 6,6 or another material, such as a metal, provided the current collector 76 is electrically insulated from the container 10 which serves as the current collector for the first electrode. Current collector 76 is an elongated nail shaped component made of brass. Collector 76 is inserted through a centrally located hole in closure member 72.

Closure member 72 is an example of a low profile closure member. As used herein, the term "low profile closure member" is intended to describe a closure member with an interior surface that is not configured to form a barrier that is intended to physically isolate fragments of a cell electrode. The low profile closure member may or may not have a ventable portion. In one embodiment, the low profile closure member is a ring shaped gasket that does not include a centrally located diaphragm.

Figure 3:
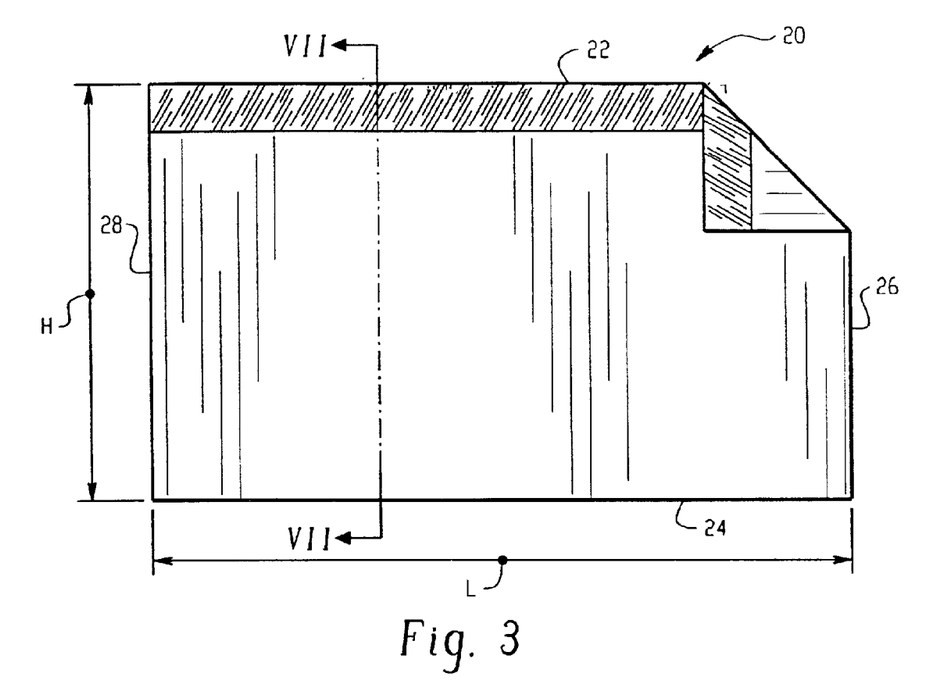
FIG. 3 is a view of a partially coiled separator strip that includes a reinforced edge.
Figure 4:
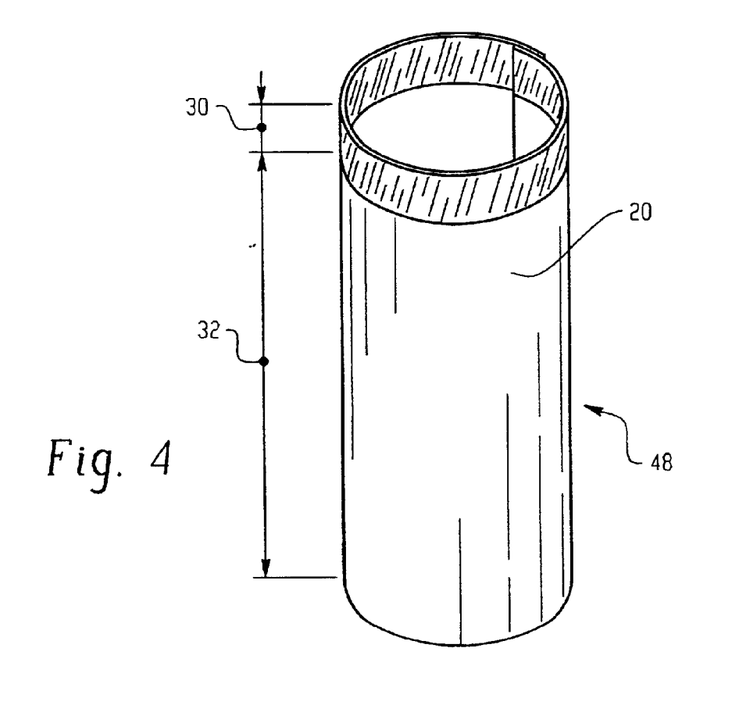
FIG. 4 shows a completely coiled separator strip with a reinforced edge.

As shown in FIGS. 3 and 4, separator 20 is made from a rectangularly shaped porous film that has been coiled to form a tube 48. The film is made from nonwoven fibers. One of the separator's functions is to provide a barrier at the interface of the first and second electrodes. The barrier must be electrically insulating and ionically permeable. Another function of the separator is to prevent direct physical contact between the first electrode and small dislodged fragments of the second electrode. Typically, fragments from the second electrode become separated from the bulk of the second electrode when the cell is dropped, shaken, vibrated, etc.

As shown in FIG. 8, the free standing portion of the separator that extends beyond the interface of the first and second electrodes must provide a barrier that will contain the second electrode's fragments 64 within the volume defined by the interior surface 74 of closure member 72, the interior surface 42 of the coiled separator 20 and the surface 62 of the second electrode 60. To insure that first region 30, see FIG. 4, of coiled separator 20 remains substantially parallel to the container's sidewall during the useful life of the battery, the first region is reinforced to provide structural support. Preferably, the reinforcing of the separator is accomplished by coating an edge of the separator with a reinforcing material that does not allow the separator to lose its strength after contact with the cell's electrolyte.

Referring to FIG. 3, separator 20 is a rectangularly shaped strip of material with a top edge 22, a bottom edge 24, a leading edge 26 and a trailing edge 28. Taken collectively, the top edge, bottom edge, leading edge and trailing edge define the separator's perimeter. The strip has a length L and a height H. A portion of the separator located below top edge 22 is coated with a reinforcing material thereby creating a coated edge portion of the separator. As used herein, the term reinforcing material means a material that has been coated onto the separator and provides or maintains the structural rigidity of the coated separator after the separator has absorbed the cell's electrolyte. Structural rigidity can be maintained by coating the separator's fibers so they do not absorb electrolyte and lose the ability to be structurally self-supporting. Alternatively, the structural rigidity of the coated separator may be maintained or improved by coating the separator's fibers with a material that solidifies upon contact with the cell's electrolyte thereby forming a film in situ on the coated edge portion of the separator. As used herein, the coated edge portion of the separator is defined to be the separator's reinforced edge. The reinforced edge is capable of maintaining the separator's structural rigidity that existed before the separator was contacted by the electrolyte. The coating material may be applied to one side or both sides of the separator. Furthermore, the coating may be applied to one side of the separator and then permeate through the separator to the opposite side of the separator. Suitable coating materials include polyethylene, polypropylene, polyamides, paraffin, methyl cellulose and chitosan. The coating material must be resistant to degradation caused by the electrolyte or other materials contained within the cell.

Figures 5, 6, 7:
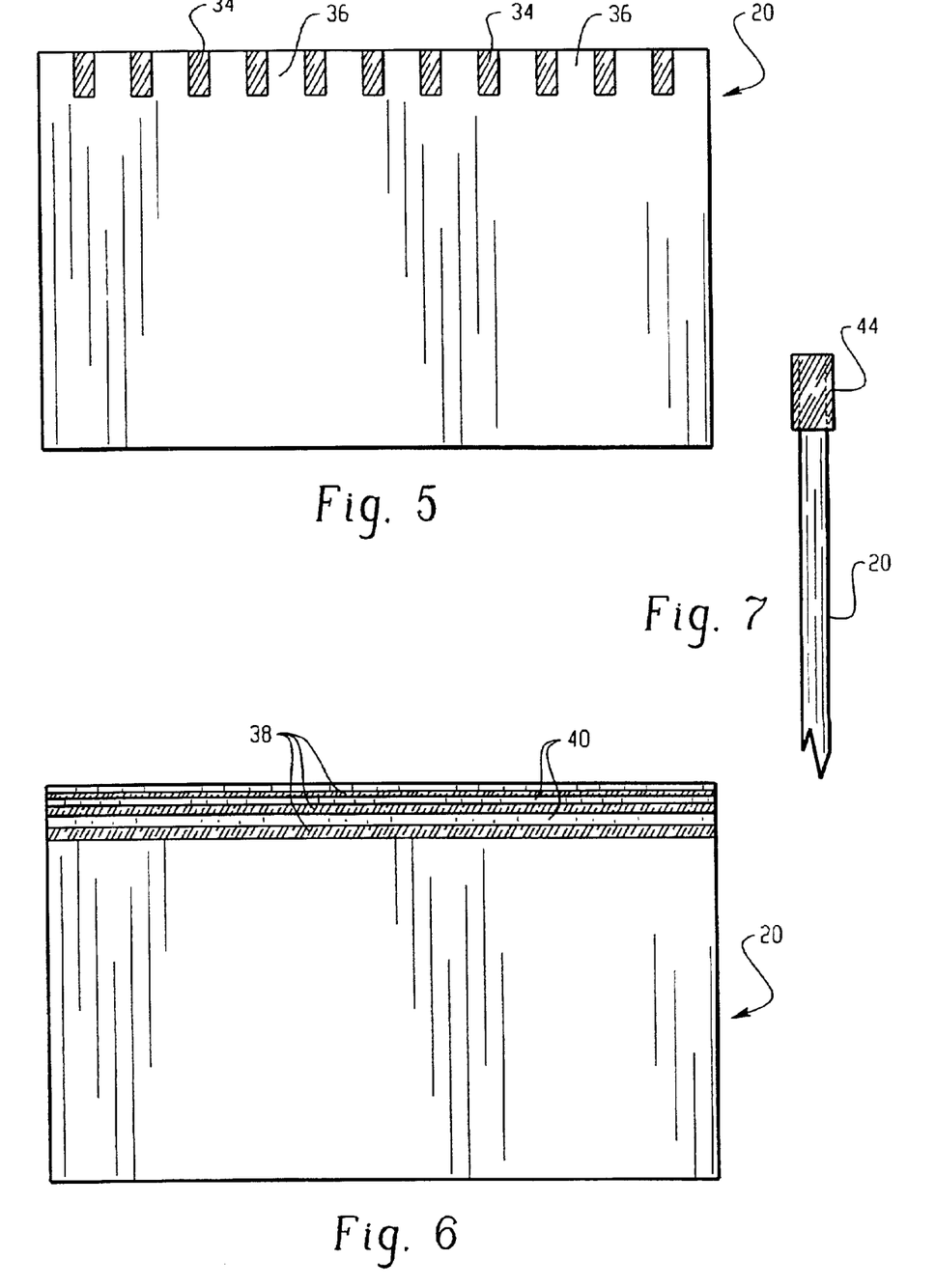
FIG. 5 shows a separator with reinforcing material applied in a first pattern to the reinforced edge portion of the separator.
FIG. 6 shows a separator with reinforcing material applied in a second pattern to the reinforced edge of the separator.
FIG. 7 shows a partial cross-sectional view of the separator of FIG. 3.

As shown in FIG. 4, separator 20 has two distinct regions. First region 30 is the portion of the separator coated with a structurally reinforcing material thereby forming a reinforced edge. Second region 32 is the portion of the separator not coated with the structurally reinforcing material used in the first region. When the separator is incorporated into the cell, as will be explained later, the separator's second region is located at the interface of the first and second electrodes. In contrast, the separator's first region projects beyond the interface defined by the electrodes and forms a free standing portion of the separator. Preferably, the entire surface of the first region is coated with the reinforcing material. However, less than the entire surface of the separator's first region may be coated provided the first portion can remain upright after the separator absorbs the cell's electrolyte. For example, the reinforcing material may be applied in a pattern that provides for some uncoated separator within the reinforced edge. As shown in FIG. 5, one possible pattern is to apply strips 34 of the reinforcing material that are parallel to the sidewall 16 of container 10. The strips are separated by uncoated sections 36 of the separator. As shown in FIG. 6, another possible pattern is to apply strips 38 of coating material that are perpendicular to the sidewall 16 of container 10 and separated by uncoated sections 40. If desired, one pattern of the reinforcing material could be applied to one side of the separator and a different pattern of the reinforcing material could be applied to the opposite side of the separator.

Shown in FIG. 7 is an enlarged cross-sectional view of the separator shown in FIG. 3. The scale of the drawing is disproportionately large in order to adequately show the details. Both sides of separator 20 are coated with the reinforcing material 44. Furthermore, the reinforcing material has coated the separator's fibers.

Figure 9:
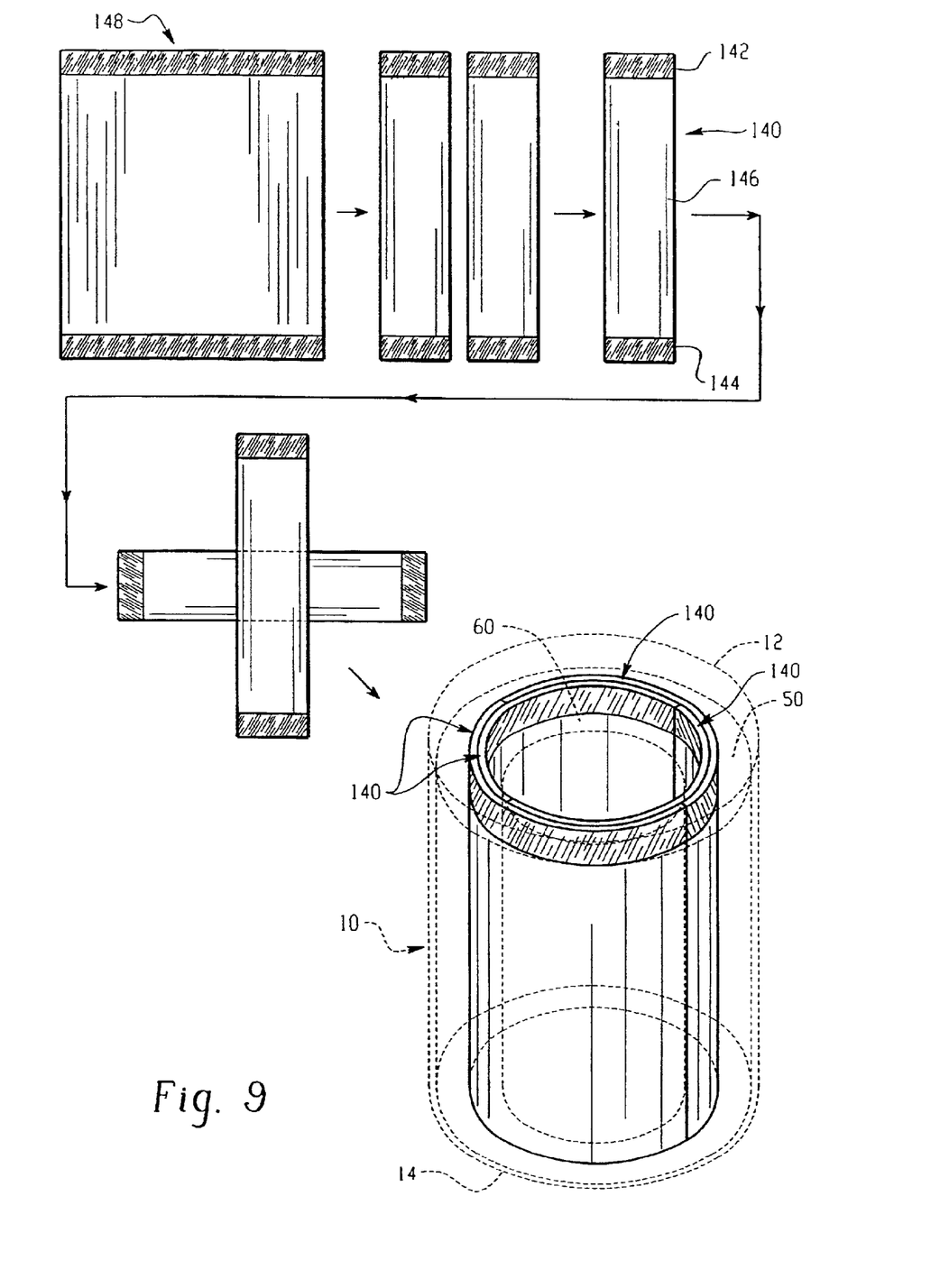
FIG. 9 shows rectangularly shaped strips of separator that have been coated on two edges and then positioned perpendicular to one another prior to their insertion into a partially assembled cell.

Shown in FIG. 9 is another embodiment of the separator useful in cells of the present invention. This embodiment utilizes a rectangularly shaped strip of separator material 148 that has been coated on its top edge 142 and bottom edge 144 with at least one reinforcing material. The top and bottom edges may be coated with the same reinforcing material or different reinforcing materials. Strip 148 is then cut into two or more substrips 140. The width of each substrip is equal to or greater than one-half the circumference of the cavity defined by the first electrode 50 in container 10. The substrip 140 is inserted so that the central region 146 of substrip 140 is located juxtapose the interior surface of the closed end 14 of container 10. The coated edges, 142 and 144, of the substrip 140 extend above first electrode 50 toward the open end 12 of container 10.

Figure 10A:
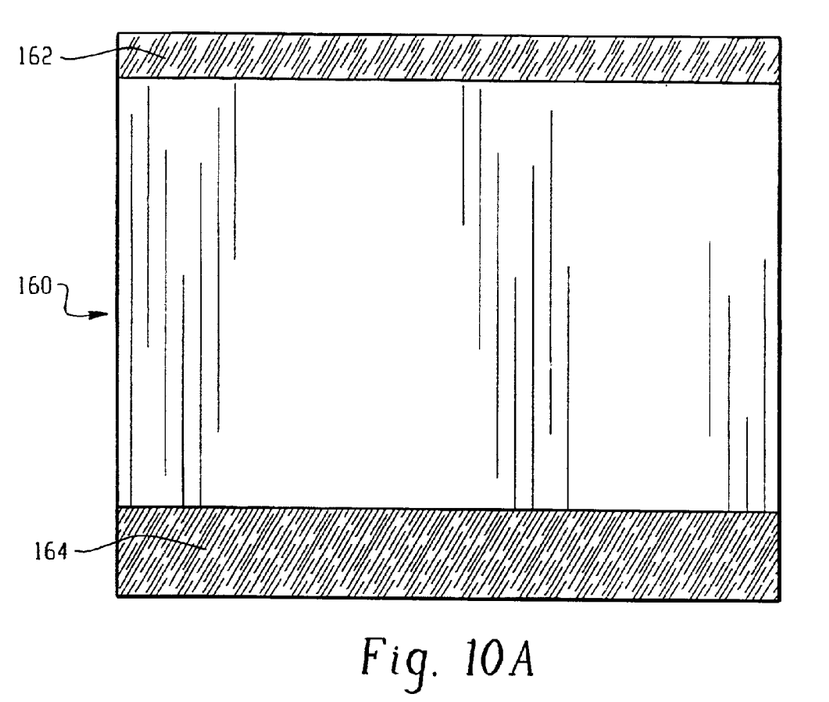
FIG. 10A shows a strip of separator coated on two edges.
Figure 10B:
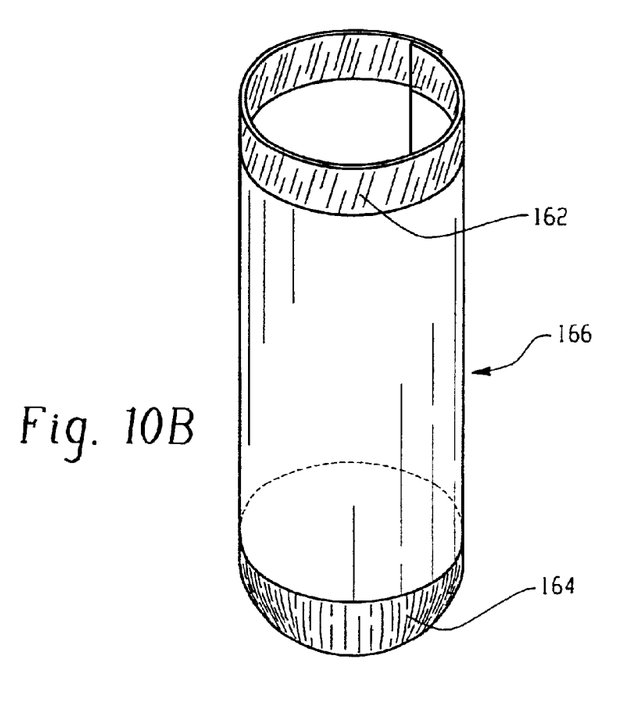
FIG. 10B shows a coiled tube made from the separator shown in FIG. 10A.

Shown in FIGS 10A and 10B is yet another embodiment of the separator useful in cells of the present invention. Separator strip 160 is coated on two mutually parallel edges with at least one reinforcing material. The strip is coiled to form a tube 166. The coated top edge 162 of strip 160 forms a ring of reinforced separator at the open end of tube 166. The bottom edge 164 of separator 160 is folded, creased, ironed or otherwise formed to seal the bottom of tube 166. A process for forming the bottom end of tube 166 is disclosed in U.S. Pat. No. 6,270,833 B1.

Figure 11:
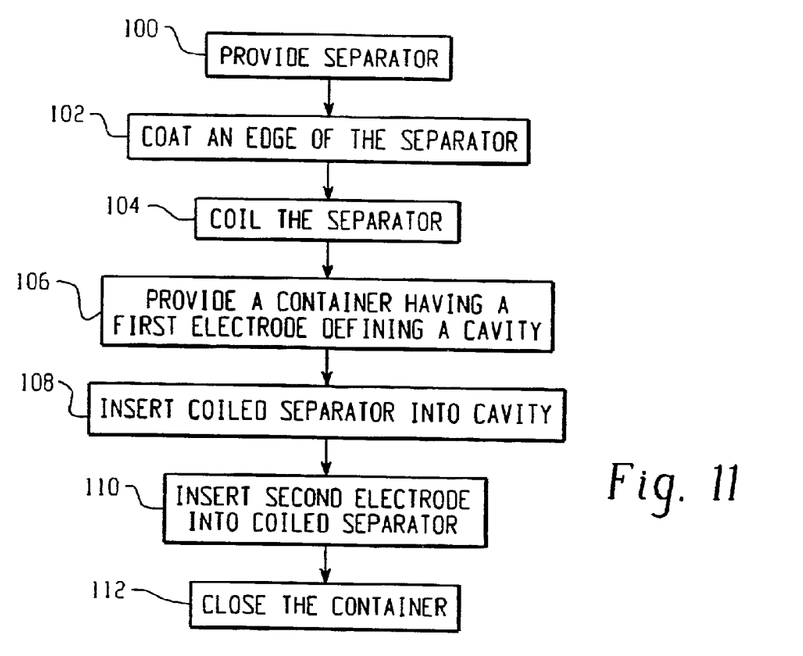
FIG. 11 is a flow diagram of a first process for assembling cells of this invention.

Processes that can be used to manufacture cells of the present invention will now be described. As shown in FIG.

11, a first process includes the step 100 of providing a separator. In a preferred embodiment, the separator is a rectangularly shaped film of nonwoven fibers. The separator has a first broad surface, a second broad surface located on the opposite side of the separator from the first broad surface, and an edge defining the separator's perimeter. As represented by step 102, a strip shaped portion of the separator's broad surface located adjacent the separator's perimeter is then coated with a reinforcing material. The coating may be applied to only one or both of the separator's broad surfaces. In one embodiment, the reinforcing material coats the fibers of the separator rather than forming a film on one side of the separator. This coating may prevent or substantially limit absorption of the cell's electrolyte by the coated fibers after the separator is inserted into a cell. Alternatively, the coating may solidify upon contact with the cell's electrolyte thereby providing structural strength to the coated portion of the separator. The coating may be applied by a conventional roll coating machine that is capable of applying a liquid layer of suitable material, such as polyethylene, to a portion of the separator's surface adjacent the separator's edge. In one embodiment, the coating is applied along just one edge of the rectangularly shaped separator. In a second embodiment, the coating is applied to two mutually parallel edges of the rectangularly shaped separator. After the coating is applied, it solidifies into a protective coating that is firmly adhered to the separator. If desired, two or more coatings may be applied. The coatings may have different chemical compositions and/or physical parameters (e.g. width, thickness, etc.) As represented by step 104, the coated strip of separator is then coiled to form a tube with at least one open end defined by the coated portion of the separator. The other end of the tube may be sealed thereby forming a closed end tubularly shaped basket. In step 106, a container is provided. As previously described, the container has an open end and includes a first electrode that defines a cavity. The first electrode and cavity formed therein are concentric with the opening in the container. In FIG. 11, step 108 represents inserting the coiled separator into the cavity defined by the first electrode. The separator is inserted so that the noncoated end of the tube contacts the first electrode and the coated edge of the tube extends beyond the first electrode toward the open end of the container. In one embodiment, the reinforcing material does not overlay and thus block the surface of the first electrode. In another embodiment, the reinforcing material may block a small portion of the interfacial surface area between the first and second electrodes. Preferably, less than twenty percent of the interfacial surface area is blocked. More preferably, less than five percent of the interfacial surface area is blocked. Most preferably, less than one percent of the interfacial surface area is blocked by the reinforcing material. A second electrode is inserted into the coiled separator in step 110. In a conventional alkaline battery, the second electrode is made by mixing zinc particles, a gelling agent and electrolyte to form a frangible slurry or paste. The consistency of the paste cannot prevent small fragments of the paste from becoming dislodged from the main body of the paste in a cell when the cell is dropped. Step 112 represents closing the container by securing a closure assembly to the open end of the container. As shown in FIG. 8, closure assembly 70 comprises closure member 72 and current collector 76.

During the cell assembly process, a quantity of an aqueous potassium hydroxide solution is incorporated into the cell. The solution serves as the cell's electrolyte. The electrolyte may be incorporated into the cell by allowing the gelling agent in the second electrode to absorb the electrolyte during the electrode manufacturing process which occurs prior to inserting the second electrode into the coiled separator. In addition, a quantity of electrolyte may be dispensed into the partially completed cell any time after the first electrode has been inserted into the container and prior to closing the cell.

Figure 12:
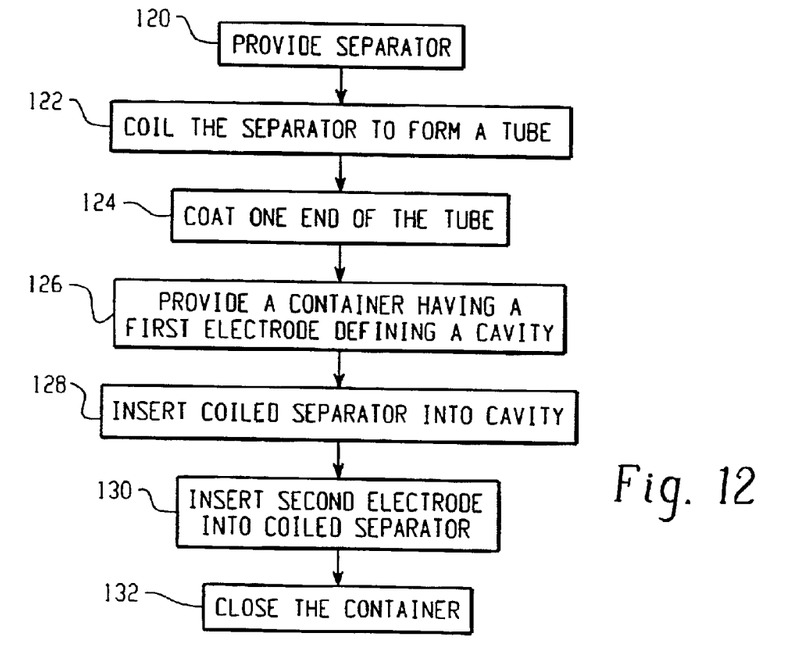
FIG. 12 is a flow diagram of a second process for assembling cells of this invention.

Shown in FIG. 12 is a second process for manufacturing cells of the present invention. Step 120 represents providing a separator. In a preferred embodiment, the separator is a porous, rectangularly shaped film of nonwoven material. The separator has two broad surfaces and an edge defining the separator's perimeter. In step 122, the separator is coiled to form a tube with at least one open end. The other end of the tube may be sealed to form a closed end tubularly shaped basket. The basket may comprise one, two or more layers of separator material in the sidewall of the basket. The number of layers is determined by controlling the length of the separator strip prior to coiling. In step 124, the open end of the coiled separator is coated with a reinforcing material. In one embodiment, the open end of the coiled separator is dipped into a vessel containing the reinforcing material in a fluid state. Preferably, the material is allowed to permeate through the separator and coat the separator's fibers. The coating may prevent or substantially limit absorption of the cell's electrolyte by the coated fibers after the separator has been inserted into a cell. The amount of separator coated with the reinforcing material should be limited to the minimum amount needed to insure that the coated portion of the separator remains parallel to the container's sidewall after the separator has been contacted by the cell's electrolyte. In addition to dip coating, the reinforcing material may be applied to the separator by spraying. If desired, the separator may be coated two or more times. The coatings may have different chemical compositions and/or physical parameters. After the coating is applied, it is allowed to solidify thereby producing a structurally self supporting circular section at the open end of the coiled separator. As represented in step 126, a container is provided. As previously described, the container has an open end and includes first electrode that defines a cavity. The first electrode and cavity formed therein are concentric with the opening in the container. In FIG. 12, step 128 represents inserting the separator tube into the cavity defined by the first electrode so that the open end of the separator tube is in close proximity to the open end of the container and the opposite end of the tube is near the closed end of the container. The coated edge of the coiled separator tube is made to extend beyond the first electrode toward the open end of the container. In step 130 a second electrode is inserted into the tube defined by the coiled separator. For a conventional cylindrical alkaline battery, the second electrode is made by mixing zinc particles, a gelling agent and electrolyte to form a frangible slurry or paste. The consistency of the paste cannot prevent small fragments of the paste from becoming dislodged from the main body of the paste in a cell when the cell is dropped. Step 132 represents closing the container by securing a closure assembly to the open end of the container. The assembly may include a closure member and a current collector.

Figure 13:
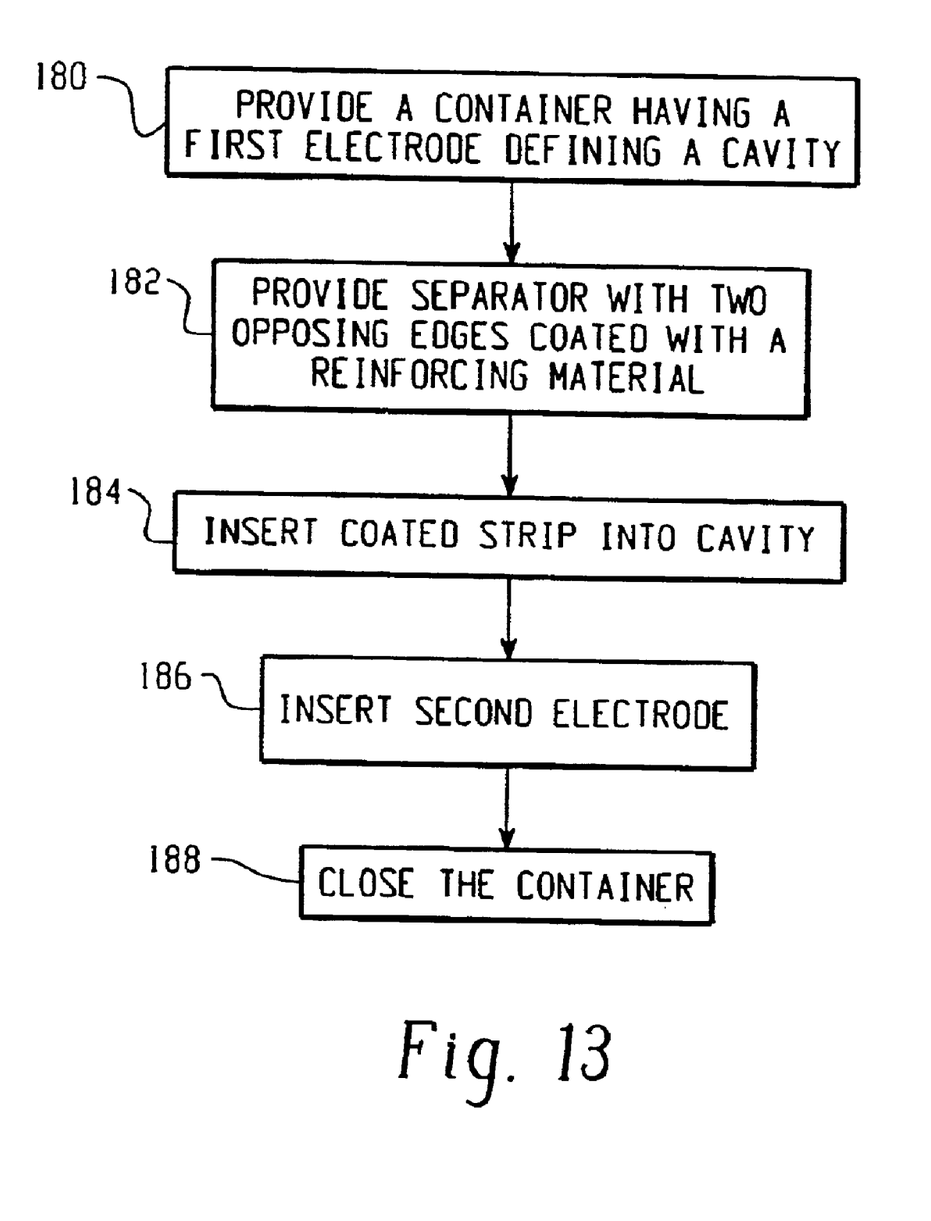
FIG. 13 is a flow diagram of a third process for assembling cells of this invention.

Shown in FIG. 13 is a third process for manufacturing cells of the present invention. Step 180 represents providing a container having an open end, a closed end and a first electrode defining a cavity therein. Step 182 represents providing a first rectangularly shaped strip of separator with two opposing edges coated with a reinforcing material. An uncoated portion of the separator lies between the two coated edges. In step 184, the first rectangularly shaped strip is inserted into the cavity defined by the first electrode. The uncoated portion of the separator lines the cavity and the coated edges extend beyond the first electrode toward the open end of the container. The coated edges are aligned so that a continuous ring of coated material is formed between the first electrode and the open end of the container. In step 186, a second electrode is inserted into the separator lined cavity. Step 188 represents closing the container by securing a closure assembly to the open end of the container.

In an alternate embodiment of the third process, a second rectangularly shaped strip of separator having two opposing edges is provided and inserted into the cavity lined by the first separator strip. Insertion of the second strip occurs prior to insertion of the second electrode. The first and second separator strips are positioned perpendicular to one another. The edges of the second strip extend beyond the first electrode toward the open end of the container. The two opposing edges of the second strip may be coated with a reinforcing material.

After the cell has been assembled using any of the above described methods, the portion of the separator located between and thus at the interface of the first and second electrodes, defined earlier as the second region of the separator, readily absorbs some of the cell's electrolyte and thereby loses some of its structural rigidity. However, since this portion of the separator is physically trapped between the first and second electrodes, the second region of the separator does not need to be structurally self supporting in order to function properly. In contrast, the coated portion of the separator, defined earlier as the first region of the separator, needs to be structurally self supporting after contacting the cell's electrolyte so that the separator remains substantially parallel to the container's sidewall during the useful life of the battery and thereby prevents fragments of the second electrode from contacting the first electrode.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

What is claimed is:

1. An electrochemical cell, comprising:
   (a) a container having an open end, a closed end and a sidewall;
   (b) a first electrode located within said container, said first electrode defining a cavity having an interior surface;
   (c) electrolyte located within said container and in contact with said first electrode;
   (d) a separator forming a lining on the interior surface of the cavity defined by said first electrode, said separator comprising a free standing reinforced edge that extends beyond said first electrode toward the open end of said container, said reinforced edge comprises a reinforcing material that provides structural support to the free standing reinforced edge of said separator after the separator has absorbed said electrolyte;
   (e) a second electrode located within the separator lined cavity, said separator forming an interface between said first and second electrodes wherein the reinforcing material covers less than twenty percent of the electrodes' interfacial surface area; and
   (f) a closure assembly secured to the open end of said container.

2. The electrochemical cell of claim 1 wherein said closure assembly comprises a low profile closure member.

3. The electrochemical cell of claim 1, wherein said separator comprises a first region located beyond the interface of said electrodes and below the closure assembly, and a second region located between the first and second electrodes, said first region comprises a reinforcing material, said second region does not comprise the reinforcing material incorporated into the first region.

4. The electrochemical cell of claim 1, wherein said reinforced edge is substantially parallel to the container's sidewall.

5. The electrochemical cell of claim 1 wherein said second electrode is a frangible gel comprising an aqueous solution of potassium hydroxide.

6. The electrochemical cell of claim 1 wherein said reinforced edge comprises a material selected from the group consisting of polyethylene, polypropylene, polyamides, paraffin, methyl cellulose and chitosan.

7. The electrochemical cell of claim 1 wherein said separator comprises a flexible porous film of nonwoven fibers having a first broad surface, a second broad surface located on the opposite side of the separator from the first broad surface, and a perimeter.

8. The electrochemical cell of claim 7 wherein said material coats the fibers in the reinforced edge thereby preventing absorption of the electrolyte by the coated portions of the fibers.

9. The electrochemical cell of claim 7 wherein said material permeates through the pores of said separator from said separator's first broad surface to said separator's second broad surface.

10. The electrochemical cell of claim 7 wherein only one of said separator's broad surfaces is partially coated with the material.

11. The electrochemical cell of claim 7 wherein both of said separator's broad surfaces are partially coated with said material.

12. The electrochemical cell of claim 1 wherein said separator is a tube having an open end, said tube formed by coiling said separator.

13. The electrochemical cell of claim 12 wherein said tubularly shaped separator is closed on one end.

14. The electrochemical cell of claim 1 wherein the reinforcing material covers less than five percent of the electrodes' interfacial surface area.

15. The electrochemical cell of claim 1 wherein the reinforcing material covers less than one percent of the electrodes' interfacial surface area.

16. The electrochemical cell of claim 1 wherein the reinforced edge comprises a continuous coating of reinforcing material.

17. The electrochemical cell of claim 1 wherein the reinforced edge comprises a discontinuous coating of reinforcing material.

18. The electrochemical cell of claim 17 wherein said discontinuous coating comprises strips of reinforcing material.

19. The electrochemical cell of claim 1, wherein said separator comprises a first rectangularly shaped strip of separator material having a central region and two mutually parallel edges, both of said mutually parallel edges comprising a reinforcing material.

20. The electrochemical cell of claim 19, wherein the central region of said strip is located juxtapose the closed end of said container and said edges of said separator extend beyond said first electrode toward said closure assembly.

21. The electrochemical cell of claim 20, further comprising a second rectangularly shaped strip of separator material having a central region and two mutually parallel edges wherein both edges comprise a reinforcing material, said central region of said second strip located juxtapose the central region of said first strip and the edges of said second strip extend beyond said first electrode toward said closure assembly.

22. The electrochemical cell of claim 21, wherein said separator comprises two elongated rectangular strips positioned perpendicular to one another and crossing at their central regions thereby forming a tube having a closed end and an open end.

23. The electrochemical cell of claim 19, wherein said first strip is coiled to form a tube comprising a reinforced opening on one end and a reinforced sealed bottom on the opposite end.

24. An electrochemical cell, comprising:
  (a) a tubularly shaped container having an open end, a closed end and a sidewall;
  (b) a first electrode located within said container, said first electrode concentric with said container's sidewall and defining a circular cavity having an interior surface;
  (c) electrolyte located within said container and in contact with said first electrode, said electrolyte comprising an aqueous solution of potassium hydroxide;
  (d) a separator forming a lining on the interior surface of the cavity defined by said first electrode, said separator comprising a free standing reinforced edge that extends beyond said first electrode toward the open end of said container, said reinforced edge comprising a reinforcing material and remaining parallel to the sidewall of said container after absorption of said electrolyte by said separator;
  (e) a frangible second electrode located within the separator lined cavity, said second electrode comprising zinc particles suspended in a gel, said separator forming an interface between said first and second electrodes, wherein the reinforcing material covers less that twenty percent of the electrodes' interfacial surface area; and
  (f) a closure assembly secured to the open end of said container, said assembly comprising a closure member overlaying and sealing the open end of said container.

25. A process for manufacturing an electrochemical cell, comprising the steps of:
  (a) providing a strip of separator;
  (b) coating at least one edge of said separator strip with a reinforcing material;
  (c) coiling the coated strip to form a tube comprising a noncoated portion and a coated reinforced edge defining an opening at one end of the tube;
  (d) providing a container having an open end and comprising a first electrode defining a cavity therein;
  (e) inserting the coiled tube into the cavity defined by the first electrode so that the noncoated portion contacts said first electrode and a coated edge of the tube extends beyond said first electrode toward the open end of said container;
  (f) inserting a second electrode into the tube defined by the coiled separator; and
  (g) closing said container by securing a closure assembly to the open end of said container.

26. The process of claim 25 wherein the reinforcing material provides structural support to said separator's reinforced edge.

27. The process of claim 25 wherein said second electrode comprises a frangible gel.

28. The process of claim 27 wherein said frangible gel comprises zinc particles and an aqueous electrolyte.

29. The process of claim 25 further comprising the step of disposing a quantity of electrolyte within the coiled tube.

30. The process of claim 25 wherein said separator comprises nonwoven fibers.

31. The process of claim 25 wherein said tube comprises two or more layers of separator.

32. The process of claim 25 wherein two edges of said separator strip are coated with said reinforcing material.

33. The process of claim 32 wherein said coated edges are parallel to one another.

34. A process for manufacturing an electrochemical cell, comprising the steps of:
  (a) providing a strip of separator;
  (a) coiling the strip to form a tube with at least one open end;
  (a) coating the open end of the tube with a reinforcing material;
  (a) providing a container having an open end, a closed end and a first electrode defining a cavity therein;
  (a) inserting the coiled tube into the cavity defined by the first electrode so that the open end of the tube is in close proximity to the open end of the container and the opposite end of the tube is in close proximity to the closed end of the container;
  (a) inserting a second electrode into the tube defined by the coiled separator; and
  (a) closing said container by securing a closure assembly to the open end of said container.

35. The process of claim 34 wherein the open end of the tube is coated by dipping a portion of the tube into a reinforcing material.

36. The process of claim 34 wherein the open end of the tube is coated by spraying a portion of the tube with a reinforcing material.

37. The process of claim 34 further comprising the step of disposing electrolyte into the cavity defined by said first electrode.

38. The process of claim 34 wherein said second electrode comprises a frangible gel.

39. The process of claim 38 wherein said frangible gel comprises zinc particles and an aqueous electrolyte.

40. The process of claim 34 wherein said separator comprises nonwoven fibers.

41. The process of claim 34 wherein said tube comprises two or more layers of separator.

42. A process for manufacturing an electrochemical cell, comprising the steps of:
  (a) providing a container having an open end, a closed end and a first electrode located within said container, said first electrode defining a cavity;
  (b) providing a first rectangularly shaped strip of separator, said separator having two opposing edges coated with a reinforcing material;
  (c) inserting said coated strip of separator into the cavity defined by said first electrode wherein the uncoated portion of said separator lines the cavity and said coated edges extend beyond said first electrode toward the open end of said container;
  (d) inserting a second electrode into the separator lined cavity; and
  (e) closing said container by securing a closure assembly to the open end of said container.

43. The process of claim 42 wherein said coated edges overlap one another thereby forming a continuous ring of coated separator material between said first electrode and the open end of said container.

44. The process of claim 42 further comprising the steps of;
(f) providing a second rectangularly shaped strip of separator having two opposing edges; and
(g) inserting said second rectangularly shaped strip of separator into the cavity lined by said first separator prior to the insertion of said second electrode, said second separator positioned perpendicular to said first strip of separator and said opposing edges extend beyond said first electrode toward the open end of the container.

45. The process of claim 44, wherein two opposing edges of said second strip of separator are coated with a reinforcing material.

* * * * *